US010087333B2

(12) United States Patent
Gaschler et al.

(10) Patent No.: US 10,087,333 B2
(45) Date of Patent: Oct. 2, 2018

(54) COATING COMPOSITIONS FOR REMOVING FREE FORMALDEHYDE FROM THE ENVIRONMENT

(71) Applicant: BASF SE, Ludwigshafen (DE)

(72) Inventors: Wolfgang Gaschler, Ludwigshafen (DE); Zhong Zeng, Shanghai (CN); Akiko Tanabe, Hong Kong (CN); Zhaobin Zhang, Shanghai (CN); Hexin Li, Shanghai (CN); Cheng-Le Zhao, Northville, MI (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/112,979

(22) PCT Filed: Jan. 20, 2015

(86) PCT No.: PCT/EP2015/050942
§ 371 (c)(1),
(2) Date: Jul. 20, 2016

(87) PCT Pub. No.: WO2015/110403
PCT Pub. Date: Jul. 30, 2015

(65) Prior Publication Data
US 2016/0340525 A1 Nov. 24, 2016

(30) Foreign Application Priority Data

Jan. 21, 2014 (CN) ................. PCT/CN2014/070984
Mar. 18, 2014 (CN) ................. PCT/CN2014/073601

(51) Int. Cl.
*B01D 53/54* (2006.01)
*C09D 7/12* (2006.01)
*C09D 5/02* (2006.01)
*B01D 53/81* (2006.01)
*C09D 125/14* (2006.01)
*C09D 175/06* (2006.01)
*C09D 7/63* (2018.01)
*C08K 5/20* (2006.01)

(52) U.S. Cl.
CPC ........... *C09D 7/1233* (2013.01); *B01D 53/54* (2013.01); *B01D 53/81* (2013.01); *C09D 5/024* (2013.01); *C09D 7/63* (2018.01); *C09D 125/14* (2013.01); *C09D 175/06* (2013.01); *B01D 2251/70* (2013.01); *B01D 2257/708* (2013.01); *C08K 5/20* (2013.01)

(58) Field of Classification Search
CPC ...... B01D 53/54; B01D 53/81; C09D 7/1233; C09D 5/024; C09D 125/14
USPC ........................................................ 588/321
See application file for complete search history.

(56) References Cited

U.S. PATENT DOCUMENTS

| 5,112,652 | A | 5/1992 | Greene |
| 5,795,933 | A | 8/1998 | Sharp et al. |
| 2008/0135060 | A1 | 6/2008 | Kuo et al. |
| 2010/0040884 | A1 | 2/2010 | Smets et al. |
| 2012/0071391 | A1 | 3/2012 | Smets et al. |
| 2012/0071392 | A1 | 3/2012 | Smets et al. |

FOREIGN PATENT DOCUMENTS

| CN | 102220056 A | 10/2011 |
| CN | 103055465 A | 4/2013 |
| EP | 0 438 284 A1 | 7/1991 |
| WO | 98/27147 A1 | 6/1998 |
| WO | 2008/073212 A2 | 6/2008 |
| WO | 2014/191573 A1 | 12/2014 |

OTHER PUBLICATIONS

International Search Report and Written Opinion dated Apr. 17, 2015 for PCT/EP2015/050942 filed on Jan. 20, 2015.

*Primary Examiner* — Edward Johnson
(74) *Attorney, Agent, or Firm* — Oblon, McClelland, Maier & Neustadt, L.L.P.

(57) ABSTRACT

The invention relates to a coating composition comprising: (a) 10% to 99.9% by weight of resin based on the total weight of the coating composition; and (b) 0.1% to 20% by weight of a formaldehyde scavenger based on the total weight of the coating composition, wherein the formaldehyde scavenger has at least one active methylene hydrogen and is solid at room temperature. The invention relates to use of a coating composition for removing free formaldehyde from the environment, wherein the formaldehyde scavenger has at least one active methylene hydrogen and is solid at room temperature.

10 Claims, No Drawings

COATING COMPOSITIONS FOR REMOVING FREE FORMALDEHYDE FROM THE ENVIRONMENT

CROSS-REFERENCE TO RELATED APPLICATIONS

This application is a National Stage of PCT/EP2015/050942, which was filed on Jan. 20, 2015. This application is based upon and claims the benefit of priority to PCT/CN2014/070984, which was filed on Jan. 21, 2014, and to PCT/CN2014/073601, which was filed on Mar. 18, 2014.

FIELD OF THE INVENTION

The invention relates to a coating composition comprising a resin and a formaldehyde scavenger for removing free formaldehyde from the environment, and use of the coating composition to remove free formaldehyde from the environment.

DESCRIPTION OF RELATED ARTS

Formaldehyde is an environmental danger and a health risk to persons. Therefore, government regulators are trying to reduce or eliminate the environmental and health risk associated with free formaldehyde. Although investigators have found some ways to reduce the amount of free formaldehyde contained in the coating compositions, there is still a need to reduce free formaldehyde released from wood furniture, adhesives, carpet, etc. to a sufficient low extent.

U.S. Pat. No. 5,795,933A discloses a waterborne coating compositions comprising (a) a formaldehyde-containing resin; (b) a formaldehyde scavenger, said scavenger consisting essentially of an organic compound having an active methylene hydrogen and a pKa of about 5 to about 13, and it shows that the free formaldehyde concentration in the coating composition can be reduced to less than 0.1% by weight after extended storage. In U.S. Pat. No. 5,795,933A, the formaldehyde scavenger is mainly used to remove the free formaldehyde released from the coating composition itself.

WO 2008/073212A2 discloses that gaseous aldehydes such as formaldehyde, acetaldehyde and acrolein may be removed permanently from air or other gaseous environments or media such as tobacco smoke by contacting a gas containing one or more aldehydes with a filter medium comprising a substrate, e.g. a filter support material, and a polymeric composition containing an acetoacetate residue. However, it is found that the acetoacetate residue in a polymeric form cannot bring about a satisfactory formaldehyde removal effect.

U.S. Pat. No. 5,112,652A discloses a formaldehyde scavenging process useful in manufacturing durable press finished fabric, the improvement comprises the step of contacting the fabric with a treatment bath containing acetoacetamide in the process of finishing it in an amount sufficient to scavenge substantially all formaldehyde without adversely affecting the durable press finished fabric.

CN102220056 discloses a paint composition that can absorb formaldehyde in a room, where porous magnesium aluminum silicate and polymeric form of 2-(methacryloyloxy)ethyl acetoacetate (AAEMA) are claimed as the functional absorption material. But the effectiveness of formaldehyde absorption via such mechanism was not satisfactory enough.

Recently, there are increasingly strict environmental regulations with respect to free formaldehyde concentration in the open or close space such as room, etc. Thus, there is still a need to provide a more effective formaldehyde scavenger useful in the coating compositions for removing free formaldehyde in the room to a relative low extent.

SUMMARY OF THE INVENTION

It has now been found that a coating composition comprising non-polymeric formaldehyde scavengers being solid at room temperature can meet the requirement above and overcome the defect in the art.

Thus, the invention provides a coating composition comprising:
(a) 10% to 99.9% by weight of a resin based on the total weight of the coating composition; and
(b) 0.1% to 20% by weight of a formaldehyde scavenger based on the total weight of the coating composition, wherein the formaldehyde scavenger has at least one active methylene hydrogen and is solid at room temperature.

The invention also provides use of a coating composition for removing free formaldehyde from the environment, wherein the formaldehyde scavenger has at least one active methylene hydrogen and is solid at room temperature.

EMBODIMENTS

In one embodiment of the invention, the invention provides a coating composition comprising:
(a) 10% to 99.9% by weight of a resin based on the total weight of the coating composition; and
(b) 0.1% to 20% by weight of a formaldehyde scavenger based on the total weight of the coating composition, wherein the formaldehyde scavenger has at least one active methylene hydrogen and is solid at room temperature, preferably has a boiling point of no less than 50° C., more preferably no less than 100° C.

In one preferred embodiment of the invention, the formaldehyde scavenger has at least one active methylene hydrogen from acetoacetyl group and is solid at room temperature, preferably has a boiling point of no less than 50° C., more preferably no less than 100° C.

In one preferred embodiment of the invention, the formaldehyde scavenger is selected from the group consisting of acetoacetamide, acetoacetanilide, potassium N-(acetoacetyl) sulfanilate, diacetoacet-2,5-dimethyl-1,4-phenylenediamide, diacetoacet-1,4-phenylenediamide, benzyl acetoacetate, 2-methoxyethyl acetoacetate and combination thereof.

Generally, the resin can be selected from polymers useful in the coating composition in the art and mixture or hybrid thereof. Preferably, the resin is selected from the group consisting of poly(meth)acrylate, polyurethane, polysiloxane, alkyd, hybrid of poly(meth)acrylate and polyurethane, hybrid of inorganic-polyacrylate and combination thereof. Said poly(meth)acrylate means polyacrylate and/or polymethacrylate. The polymers can be homopolymers, copolymers, etc. Preferably, the polymers have a weight average molecular weight (Mw) from 500 to 1,000,000.

In one preferred embodiment of the invention, the coating composition can comprise 15% to 80% by weight of the resin based on the total weight of the coating composition. Preferably, the coating composition can comprise 0.5% to 10% by weight of the formaldehyde scavenger based on the total weight of the coating composition.

In one embodiment of the invention, the coating composition can further comprise an additive known in the art.

Preferably said additive is selected from the group consisting of antioxidant, pigment, thickener, defoamer, levelling agent, coalescence agent, dispersant, surfactant, biocide and combination thereof.

In one embodiment of the invention, the invention also provides use of a coating composition for removing free formaldehyde from the environment such as room, etc, wherein the formaldehyde scavenger has at least one active methylene hydrogen and is solid at room temperature, preferably has a boiling point of no less than 50° C., more preferably no less than 100° C.

In one embodiment of the invention, the coating composition is prepared by mixing the resin and formaldehyde scavenger in a manner well known in the art. In one preferred embodiment of the invention, additives useful in the art can be added in the preparation process, as described above.

Formaldehyde concentrations are measured by HPLC according to ASTM D5910.

All percentages are mentioned by weight unless otherwise indicated.

EXAMPLES

The present invention is now further illustrated by reference to the following examples, however, the examples are used for the purpose of explanation and not intended to limit the scopes of the invention.

Example 1

A 4 L-reactor was inertized by passing nitrogen through for 10 min, then charged with 700 g of demineralized water, 25 g of a 33% seed latex of polystyrene with a particle size of 33 nm. The reactor containing the above charge was heated to 85° C., and stirred over the complete time of synthesis. 5 g of 7% sodium peroxosulfate aqueous solution was added at 85° C. After the addition, an emulsion feed, mixed by 520 g of demineralized water, 26 g of a sodium salt of a fatty alcohol polyglycol ether sulfate and 6.5 g of sodium dodecyl sulfate, 645 g of styrene, 587 g of n-butyl acrylate and 46 g of methacrylic acid, was started and fed within 210 minutes. In parallel to the emulsion feed, 95 g of 7 wt % sodium peroxosulfate aqueous solution was started and fed to the reactor with 240 min. After the end of the initiator feed, the reaction mixture was cooled to 75° C. To the reaction mixture was then added 43 g of a 8% aqueous solution of sodium hydroxide within 5 min. After that 26 g of a 10% aqueous solution of tert butyl hydroperoxide solution and 20 g of a 13% solution of sodium sulfite were added within 60 min. After the end of the feed, the reaction mixture was cooled to room temperature and mixed with 28 g acetoacetamide (AAM).

The resulting latex had a solids content of 48.1%, the particle size was 146 nm measured by dynamic light scattering. The pH was 6.9. The glass transition temperature was 21° C.

Comparison Example 1

The dispersion was synthesized identical to that described in Example 1 with the exception that AAM was added.

The resulting latex had a solids content of 47.4%, the particle size was 144 nm measured by dynamic light scattering. The pH was 7.0. The glass transition temperature was 19° C.

Example 2

Formulate 100 g of the dispersion synthesized from Example 1, with 126 g of demineralized water, 2 g of dispersant N40 from BASF, 2 g of defoamer DC065 from Dow Corning, 70 g of $TiO_2$ CR828 from Kerr-McGee, 95 g of $CaCO_3$ Omyarcab 5 from Omya, 70 g of China Clay DB-1 from China Kaolin Company, 6 g of Coasol 290 from Dow, 23 g of 2% Natrosol 250HBR from Ashland.

Add 1000 ppm formaldehyde to the mixture prepared above, the residual formaldehyde after 1 day, checked HPLC according to ASTM D5910, was 52 ppm.

Comparison Example 2

Formulate 100 g of the dispersion prepared from Comparison Example 1, with identical additives described in Example 2, then add 1000 ppm formaldehyde to the mixture prepared above, the residual formaldehyde after 1 day, checked by using HPLC, was 1004 ppm.

By comparison of example 2 and Comparison Example 2, it shows that coating composition using formaldehyde scavenger of the present invention can effectively remove free formaldehyde to a very low extent, while coating composition without using formaldehyde scavenger cannot remove any free formaldehyde.

Example 3

A 4 L-reactor was inertized by passing nitrogen through for 10 min, then charged with 505 g of demineralized water, 62 g of a 33% seed latex of polystyrene with a particle size of 33 nm. The reactor containing the above charge was heated to 85° C., and stirred over the complete time of synthesis. An emulsion feed, mixed by 565 g of demineralized water, 26 g of a sodium salt of a fatty alcohol polyglycol ether sulfate and 12 g of a fatty alcohol polyethoxylate, 380 g of methyl methacrylate, 866 g of n-butyl acrylate and 36 g of acrylic acid, was started and fed within 180 minutes. In parallel to the emulsion feed, 56 g of 7 wt % sodium peroxosulfate aqueous solution was started and fed to the reactor with 210 min. After the end of the initiator feed, the reaction mixture was cooled to 75° C. To the reaction mixture was then added 5 g of a 20% ammonia aqueous solution. After that 23 g of a 10% aqueous solution of tert butyl hydroperoxide solution and 25 g of a 13% solution of sodium sulfite were added within 60 min. After the end of the feed, the reaction mixture was cooled to room temperature and mixed with 65 g AAM.

The resulting latex had a solids content of 48.1%, the particle size was 146 nm measured by dynamic light scattering. The pH was 6.9. The glass transition temperature was −10° C.

100 g of the dispersion prepared above was formulated with identical additives described in Example 2, then add 200 ppm formaldehyde to the mixture prepared above, the residual formaldehyde after 1 day, checked by using HPLC, was 20 ppm.

Comparison Example 3

The mixture was prepared identical to that described in Example 3, with exception that AAM was added during the dispersion preparation stage.

Add 200 ppm formaldehyde to the mixture prepared above, the residual formaldehyde after 1 day, checked by using HPLC, was 241 ppm.

By comparison of example 3 and comparison example 3, it shows that coating composition using formaldehyde scavenger of the present invention can effectively remove free formaldehyde to a very low extent, while coating composition without using formaldehyde scavenger cannot remove any free formaldehyde.

Example 4

Add 1000 ppm formaldehyde to 100 g of dispersion prepared from Example 1, the residual formaldehyde after 1 day, checked by using HPLC, was 52 ppm.

Comparison Example 4

A 4 L-reactor was inertized by passing nitrogen through for 10 min, then charged with 600 g of demineralized water, 25 g of a 33% seed latex of polystyrene with a particle size of 33 nm. The reactor containing the above charge was heated to 85° C., and stirred over the complete time of synthesis. 5 g of 7% sodium peroxosulfate aqueous solution was added at 85° C. After the addition, an emulsion feed, mixed by 450 g of demineralized water, 28 g of a sodium salt of a fatty alcohol polyglycol ether sulfate, 645 g of styrene, 587 g of n-butyl acrylate, 40 g of 2-(methacryloyloxy)ethyl acetoacetate and 46 g of methacrylic acid, was started and fed within 210 minutes. In parallel to the emulsion feed, 95 g of 7 wt % sodium peroxosulfate aqueous solution was started and fed to the reactor with 240 min. After the end of the initiator feed, the reaction mixture was cooled to 75° C. To the reaction mixture was then added 45 g of a 8% aqueous solution of sodium hydroxide within 5 min. After that 26 g of a 10% aqueous solution of tert butyl hydroperoxide solution and 36 g of a 13% solution of sodium sulfite were added within 60 min. After the end of the feed, the reaction mixture was cooled to room temperature.

The resulting latex had a solids content of 48.0%, the particle size was 148 nm measured by dynamic light scattering. The pH was 7.1. The glass transition temperature was 20° C.

Add 1000 ppm formaldehyde to 100 g of the dispersion prepared above, the residual formaldehyde after 1 day, checked by using HPLC, was 739 ppm.

By comparison of Example 4 and Comparison Example 4, it shows that coating composition using formaldehyde scavenger of the present invention can significantly remove free formaldehyde to a very low extent, while coating composition using formaldehyde scavenger in a polymeric form can only slightly remove free formaldehyde.

Example 5

The mixture was prepared identical to that described in Example 2, whilst the 28 g of AAM was replaced with 140 g of potassium N-(acetoacetyl) sulfanilate (AAK).

Add 1000 ppm formaldehyde to the mixture prepared above, the residual formaldehyde after 1 day, checked by using HPLC, was 43 ppm.

Example 6

The mixture was prepared identical to that described in Example 2, whilst the 28 g of AAM was replaced with 70 g of diacetoacet-2,5-dimethyl-1,4-phenylenediamide (DM)

Add 1000 ppm formaldehyde to the mixture prepared above, the residual formaldehyde after 1 day was non-detectable by HPLC.

Example 7

The mixture was prepared identical to that described in Example 2, whilst the 28 g of AAM was replaced with 70 g of benzyl acetoacetate (BAA)

Add 1000 ppm formaldehyde to the mixture prepared above, the residual formaldehyde after 1 day, checked by using HPLC, was 38 ppm.

Example 8

The mixture was prepared identical to that described in Example 2, whilst the 28 g of AAM was replaced with 70 g of 2-methoxyethyl acetoacetate (MOEAA).

Add formaldehyde 1000 ppm to the mixture prepared above, the residual formaldehyde after 1 day was non-detectable by HPLC.

Example 9

The dispersion was synthesized identical to that described in Example 1, whilst the 28 g of AAM was replaced with 42 g of DM.

Formulate 100 g of the dispersion prepared above, with 126 g of demineralized water, 2 g of dispersant MD20 from BASF, 2 g of defoamer W092 from Elementis, 65 g of $TiO_2$ CR828 from Kerr-McGee, 100 g of $CaCO_3$ Omyarcab 5 from Omya, 75 g of Wash Clay 1250 mesh from Shanghai Nonmetallic Chemicals, 5 g of Lusolvan FBH from BASF, 1 g of NHS300 from Aquaflow.

Add 1000 ppm formaldehyde to the mixture prepared above, the residual formaldehyde after 1 day, checked by using HPLC, was 46 ppm.

Example 10

Formulate 100 g of the dispersion synthesized from Example 3, with identical additives described in Example 9.

Formaldehyde absorption test was carried out by using the industrial standard JC/T 1074-2008. The absorption efficiency was 86%, and the purification durability was 70%.

Example 11

203 g of a polyester prepared from adipic acid, hexanediol and neopentyl glycol, having an OH value of 55 mg KOH/g were dewatered at from 110 to 120° C. and at 30 mbar for 30 minutes. The polyester was cooled and dissolved in 200 g acetone, and 40.5 g 1,4-butanediol were added. A mixture of 69.7 g toluene diisocyanate (isomer ratio 2,4/2,6=80/20) and 69.7 g hexamethylene diisocyanate, as well as 0.02 g dibutyltin dilaurate was then added. After stirring at 60° C. for 3 hours, the batch was diluted with 300 g acetone and cooled to room temperature. 19.3 g of a 40% aqueous solution of the equimolar addition product of ethylenediamine and sodium acrylate were stirred into the solution of the prepolymer thus obtained. After 20 minutes, 500 g water were added dropwise, and the acetone was then distilled off at reduced pressure. Mix 22 g of AAM into the polyurethane dispersion prepared above.

Add formaldehyde 1000 ppm to the mixture prepared above, the residual formaldehyde after 1 day, checked by using HPLC, was 11 ppm.

Example 12

A 1 L-reactor was inertized by passing nitrogen through for 10 min, then charged with 91 g of demineralized water and 230 g of the polyurethane dispersion prepared from Example 11 with exception that AAM was added. The reactor containing the above charge was heated to 80° C., and stirred over the complete time of synthesis. A monomer feed, consisting of 35 g methyl methacrylate and 86 g n-butyl acrylate, was started and fed within 180 minutes. In parallel to the emulsion feed, 10 g of 7 wt % sodium peroxosulfate aqueous solution was started and fed to the reactor with 210 min. After that 3 g of a 10% aqueous solution of tert butyl hydroperoxide solution and 1.5 g of a 13% solution of sodium sulfite were added within 60 min. After the end of the feed, the reaction mixture was cooled to room temperature and mixed with 12.5 g AAM.

Add formaldehyde 1000 ppm to the polyurethane-polyacrylate hybrid dispersion prepared above, the residual formaldehyde after 1 day, checked by using HPLC, was non-detectable.

Example 13

The dispersion was synthesized identical to that described in Example 1, whilst the 28 g of AAM was replaced with 70 g of diacetoacet-1,4-phenylenediamide (DiAAphen).

Add formaldehyde 1000 ppm to the mixture prepared above, the residual formaldehyde after 1 day, checked by using HPLC, was non-detectable.

Comparison Example 5

The mixture was synthesized identical to that described in Example 2, whilst the 28 g of AAM was replaced with 140 g of methyl acetoacetate Formaldehyde absorption test was carried out by using the industrial standard JC/T 1074-2008. The absorption efficiency was 51%, and failed to pass the test.

Comparison Example 6

The mixture was synthesized identical to that described in Example 2, whilst the 28 g of AAM was replaced with 70 g of ethyl acetoacetate Formaldehyde absorption test was carried out by using the industrial standard JC/T 1074-2008. The absorption efficiency was 54%, and failed to pass the test.

Comparison Example 7

The mixture was synthesized identical to that described in Example 2, whilst the 28 g of AAM was replaced with 140 g of isopropyl acetoacetate.

Formaldehyde absorption test was carried out by using the industrial standard JC/T 1074-2008. The absorption efficiency was 76%, but the purification durability was 44% and failed to pass the test.

It can be seen from comparison examples 5 to 7 that coating compositions using formaldehyde scavengers such as methyl acetoacetate, ethyl acetoacetate, isopropyl acetoacetate, can only slightly remove free formaldehyde, because these formaldehyde scavengers have lower boiling points than those of the formaldehyde scavengers of the present invention such that they evaporate quickly from the coating compositions.

It will be apparent to those skilled in the art that various modifications and variations can be made in the present invention without departing from the scope or spirit of the invention. Thus, it is intended that the present invention cover such modifications and variations as come within the scope of the appended claims and their equivalents.

The invention claimed is:

1. A coating composition, comprising:
   (a) 10% to 99.9% by weight of a resin based on the total weight of the coating composition; and
   (b) 0.1% to 20% by weight of a formaldehyde scavenger based on the total weight of the coating composition, wherein the formaldehyde scavenger has at least one active methylene hydrogen and is solid at room temperature,
   wherein:
   the resin is selected from the group consisting of poly(meth)acrylate, polyurethane, polysiloxane, alkyd, hybrid of poly(meth)acrylate and polyurethane, hybrid of inorganic-polyacrylate and any combination thereof; and
   the formaldehyde scavenger is selected from the group consisting of acetoacetamide, acetoacetanilide, potassium N-(acetoacetyl) sulfanilate, diacetoacet-2,5-dimethyl-1,4-phenylenediamide, diacetoacet-1,4-phenylenediamide, and any combination thereof.

2. The composition according to claim 1, wherein the formaldehyde scavenger has a boiling point of no less than 50° C.

3. The composition according to claim 1, wherein the formaldehyde scavenger is selected from the group consisting of acetoacetanilide, potassium N-(acetoacetyl) sulfanilate, diacetoacet-2,5-dimethyl-1,4-phenylenediamide, diacetoacet-1,4-phenylenediamide, and any combination thereof.

4. The composition according to claim 1, wherein the resin is selected from the group consisting of a polyurethane, a polysiloxane, an alkyd, a hybrid of a poly(meth)acrylate and a polyurethane, a hybrid of an inorganic-polyacrylate, and any combination thereof.

5. The composition according to claim 1, wherein the coating composition comprises 15% to 80% by weight of the resin based on the total weight of the coating composition.

6. The composition according to claim 1, wherein the coating composition comprises 0.5% to 10% by weight of the formaldehyde scavenger based on the total weight of the coating composition.

7. The composition according to claim 1, wherein the coating composition further comprises an additive selected from the group consisting of an antioxidant, a pigment, a thickener, a defoamer, a levelling agent, a coalescence agent, a dispersant, a surfactant, a biocide, and any combination thereof.

8. A removal method, comprising:
   removing free formaldehyde from the environment with the composition according to claim 1,
   wherein the formaldehyde scavenger has at least one active methylene hydrogen and is solid at room temperature.

9. The method according to claim 8, wherein the formaldehyde scavenger has a boiling point of no less than 50° C.

10. The method according to claim 8, wherein the formaldehyde scavenger is selected from the group consisting of acetoacetamide, acetoacetanilide, potassium N-(acetoacetyl) sulfanilate, diacetoacet-2,5-dimethyl-1,4-phenylenediamide, diacetoacet-1,4-phenylenediamide, and any combination thereof.

* * * * *